(12) United States Patent
Jassal et al.

(10) Patent No.: US 8,252,187 B2
(45) Date of Patent: Aug. 28, 2012

(54) PARTICLE SEPARATOR

(75) Inventors: Mukash Jassal, Gravesend (GB); Neil Watson, Haywards Heath (GB)

(73) Assignee: Alpha Fry Limited, Surrey (GB)

( * ) Notice: Subject to any disclaimer, the term of this patent is extended or adjusted under 35 U.S.C. 154(b) by 124 days.

(21) Appl. No.: 12/936,087

(22) PCT Filed: Mar. 18, 2009

(86) PCT No.: PCT/GB2009/000728
§ 371 (c)(1),
(2), (4) Date: Dec. 23, 2010

(87) PCT Pub. No.: WO2009/122127
PCT Pub. Date: Oct. 8, 2009

(65) Prior Publication Data
US 2011/0100923 A1    May 5, 2011

(30) Foreign Application Priority Data

Apr. 3, 2008  (GB) .................................. 0806091.5

(51) Int. Cl.
*B01D 35/06* (2006.01)
*B01D 21/26* (2006.01)
*B03C 1/02* (2006.01)
*C02F 1/48* (2006.01)

(52) U.S. Cl. ..... 210/695; 210/222; 210/223; 210/512.1; 210/788; 210/806; 209/12.1; 209/732; 209/214; 209/232

(58) Field of Classification Search .................. 210/222, 210/223, 512.1, 695, 788, 806; 209/12.1, 209/732, 214, 232
See application file for complete search history.

(56) References Cited

U.S. PATENT DOCUMENTS 5,224,604 A    7/1993 Duczmal et al.
(Continued)

FOREIGN PATENT DOCUMENTS

EP    0083444 A    7/1983
(Continued)

OTHER PUBLICATIONS

Written Opinion for Parent PCT_GB_2009_000728, Nov. 9, 2009.*

(Continued)

*Primary Examiner* — David A Reifsnyder
(74) *Attorney, Agent, or Firm* — Lando & Anastasi, LLP

(57) ABSTRACT

A method and apparatus (10) for separating magnetic and non-magnetic particles from water in a domestic central heating system is disclosed. A magnet (60) is located in the housing and the inlet and the outlet are arranged so that, in use, water flows through the apparatus in a cyclonic motion from the inlet downwardly proximate the walls of the housing, and then upwardly within the downwardly flowing water, to the outlet. Particles entrained within the water separate out by vortex separation as the water flows downwardly. Also, magnetic particles entrained within the water are collected on the magnet as the water flows upwardly. The apparatus also comprises a sleeve (30) located within the housing such that an outer circulation channel (31) is defined between the housing and the sleeve. The magnet is located within the sleeve such that an inner circulation channel (61) is defined between the sleeve and the magnet. The inlet (40) of the housing is arranged to deliver the water into the outer circulation channel, and the outlet (50) of the housing is arranged to exhaust the water from the inner circulation channel.

9 Claims, 2 Drawing Sheets

U.S. PATENT DOCUMENTS

| | | |
|---|---|---|
| 5,735,937 A | 4/1998 | Dingfelder |
| 2001/0013491 A1 | 8/2001 | Kaske |
| 2002/0096464 A1 | 7/2002 | Simonson |

FOREIGN PATENT DOCUMENTS

| | | |
|---|---|---|
| GB | 2284620 A | 6/1995 |
| WO | 2004078356 A | 9/2004 |

OTHER PUBLICATIONS

Applicant's Commments on Written Opinion PCT_GB_2009_000728, Feb. 10, 2010.*

* cited by examiner

PARTICLE SEPARATOR

The present invention relates to a method and apparatus for separating particles entrained in water. In particular, the present invention relates to a method and apparatus for separating out metallic and non-metallic particles from water in a domestic central heating system.

Domestic central heating systems typically comprise a number of radiators through which hot water circulates. As the water moves around the central heating system, it collects particulate contaminants such as dirt and corrosion from the inner surfaces of the pipes and radiators. This particulate contamination can, over time, build up and lead to blockages in the system and damage to sensitive components such as pumps.

A device for separating magnetic particles from water circulating within a central heating system is disclosed in WO 2004/105954. This device comprises a magnet located within a housing through which water from the central heating system flows. As the water moves past the magnet, magnetic particles entrained within the water are collected by the magnet. However, this device does not collect non-magnetic particles from the flow.

In a first aspect, the present invention provides an apparatus for separating magnetic and non-magnetic particles from water in a domestic central heating system, comprising a housing having an inlet and an outlet and an upper and lower end, and a magnet located within the housing, wherein the inlet and the outlet are arranged so that, in use, water flows through the apparatus in a cyclonic motion from the inlet downwardly proximate the walls of the housing, and then upwardly within the downwardly flowing water, to the outlet, wherein the housing is configured so that particles entrained within the water separate out by vortex separation as the water flows downwardly, and wherein the magnet is arranged so that magnetic particles entrained within the water are collected by the magnet as the water flows upwardly, the apparatus further comprising a sleeve located within the housing such that an outer circulation channel is defined between the housing and the sleeve, the magnet being located within the sleeve such that an inner circulation channel is defined between the sleeve and the magnet, wherein the inlet is arranged to deliver the flow of water into the outer circulation channel and wherein the outlet is arranged to exhaust the flow of water from the inner circulation channel.

The apparatus of the present invention is advantageous as both magnetic and non-magnetic particles may be separated from the flow of water. In addition, the sleeve allows a greater degree of flexibility with regard to the position of the outlet.

Preferably the present invention comprises a non-magnetic magnet cover which is arranged to prevent direct contact between the magnet and the water. This facilitates cleaning of the magnet since the magnet can be removed from the non-magnetic magnet cover thereby allowing the magnetic particles to simply fall from the magnet cover.

In a preferred example, the magnet cover has a tapered end facing the lower end of the housing in order to reduce disruption to the upwardly flowing water. The taper encourages the upwardly flowing water to swirl around the magnet cover.

The upper end of the housing preferably has a larger cross-sectional area than the lower end of the housing to assist in the formation of a cyclonic flow. More preferably, the upper end of the housing is substantially cylindrical and the lower end of the housing is substantially conical.

In a preferred example the inlet and the outlet are located proximate the upper end of the housing in order to maximise the surface areas which the downward and upward flows may come into contact with.

The apparatus preferably comprises a quiet zone located at the lower end of the housing in which the flow of water decelerates so that entrained particles may more readily fall out of the flow. The quiet zone preferably comprises a substantially spherical bulb.

In a second aspect, the present invention provides a method for separating magnetic and non-magnetic particles from water in a domestic central heating system, the method comprising: providing a housing containing a magnet located within a sleeve, wherein the sleeve is arranged so that an outer circulation channel is defined between the housing and the sleeve, and an inner circulation channel is defined between the sleeve and the magnet, flowing water in a cyclonic motion through the housing from an inlet located in the outer circulation channel downwardly proximate the walls of the housing, and then upwardly, within the downwardly flowing water, to an outlet located in the inner circulation channel, wherein particles are separated out from the water by vortex separation as the water flows downwardly, and wherein magnetic particles are collected from the water by the magnet as the water flows upwardly.

An example of the present invention will now be described with reference to the following figures in which.

Figure 1:
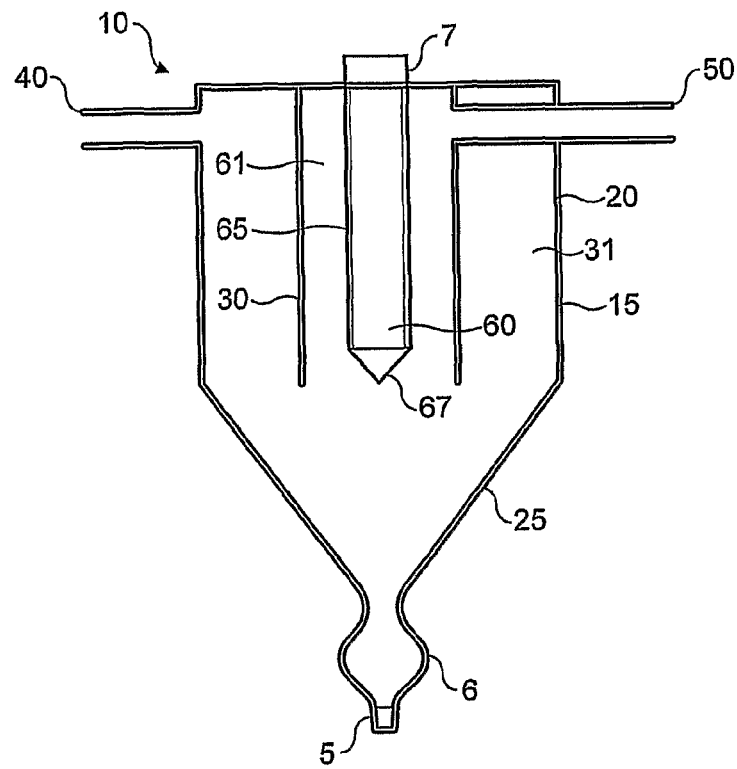
FIG. 1 shows a schematic elevational view of an apparatus according to the present invention.

The apparatus 10 shown in FIG. 1 comprises a housing 15 consisting of an upper substantially cylindrical portion 20 and a lower substantially conical portion 25. A bulb 6 is located at the lowermost end of the conical portion 25. The lower end of the bulb 6 is closed by a plug or cap 5 which may be removed to allow the apparatus to be cleaned.

In this example, the upper cylindrical portion 20 has an inner diameter of 150 mm and the lowermost end of the conical portion 25 has an inner diameter of 22 mm, the bulb 6 has a diameter of 44 mm at its widest point. The apparatus 10 has an overall height of 400 mm, the cylindrical portion 20 having a height of 200 mm, the conical portion 25 having a height of 150 mm and the bulb 6 having a height of 50 mm. It will be understood that these dimensions are intended as examples only and that the apparatus 10 may have other dimensions depending on the requirements of the central heating system in which it is to be used. The housing and sleeve may be made from glass filled nylon, glass reinforced plastic or any other suitable material.

The apparatus 10 further comprises a sleeve 30 which is located within the housing 15 such that an outer circulation channel 31 is defined between the housing 15 and the sleeve 30. A magnet 60, located within a non-magnetic magnet cover 65, is positioned within the sleeve 30 such that an inner circulation channel 61 is defined between the magnet cover 65 and the sleeve 30. The lowermost end 67 of the magnet cover 65 facing the lower end of the housing 15 is tapered.

The magnet 60 and magnet cover 65 are secured to the housing 15 by means of cap 7 which may be removed to allow the magnet 60 and/or the magnet cover 65 to be removed from the housing 15. Alternatively, the magnet cover 65 may be fixed to the housing 15 so that only the magnet 60 is removable.

An inlet 40 opens into the housing 15 to deliver water into the outer circulation channel 31 proximate the upper end of the housing. Outlet 50 opens into the inner circulation channel 61 and passes through the wall of the housing 15 proximate its upper end. The inlet 40 and outlet 50 are arranged so that water flowing in the apparatus 10 flows from the inlet 40 to the outlet 50 in a cyclonic motion as described below.

Figure 2:
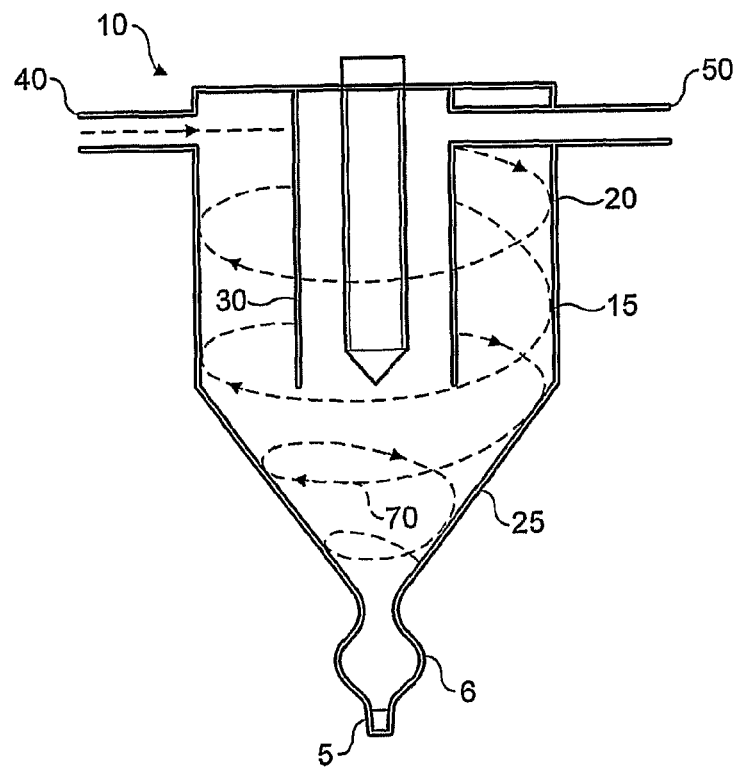
FIG. 2 shows the downward flow pattern of water within the apparatus of FIG. 1.

As shown in FIG. 2, water enters the apparatus 10 through inlet 40 and then flows in a spiral pattern 70 downwardly proximate the walls of the housing 15 towards the lowermost end of the conical portion 25. As the water flows downwardly, entrained particulates in the water strike the walls of the housing 15 and sink to the bottom of the conical portion 25 due to vortex separation.

The bulb 6 provides a quiet zone in which the water decelerates. This quiet zone helps the particles to separate from the flow as the particles are better able to fall out of the flow when the flow has a lower velocity. The plug or cap 5 may be periodically removed so that the particulate matter may be emptied from the apparatus 10.

In the example described, the quiet zone is provided by means of a substantially spherical bulb 6. However, It is not necessary that the quite zone be realised in this manner. The quiet zone may be provided by any suitable configuration which diverges from the lowermost end of the conical section 25 and thereby reduces the velocity of the water. For example, a divergent exit pipe.

Figure 3:
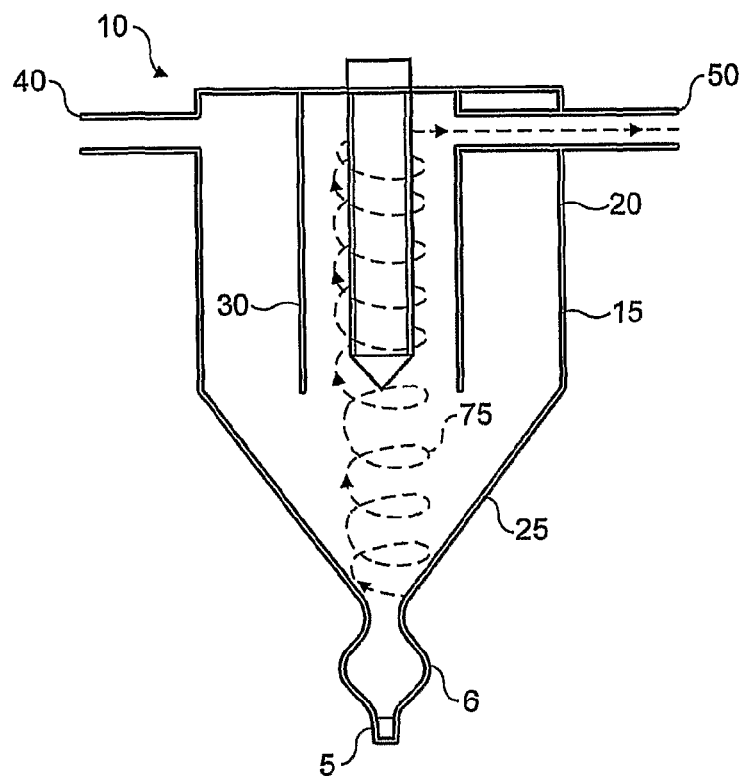
FIG. 3 shows the flow pattern of water flowing upwardly within the apparatus of FIG. 1.

FIG. 3 illustrates the upward flow of the water within the apparatus 10. As shown, the water flows upwardly in a spiral pattern 75 until it reaches the inner circulation channel 61 where it continues to flow upwardly spiraling about the magnet 60 and magnet cover 65 until it reaches the outlet 50. The tapered end 67 of the magnet cover 65 helps to ensure that the water continues to flow in a spiral pattern when it encounters the magnet cover 65.

As the water flows past the magnet cover 65, magnetic particles entrained within the water collect on the surface of the magnet cover 65 due to the attraction of the magnetic field generated by the magnet 60. The magnet cover 65 and magnet 60 may be periodically removed from the housing 15 to allow the magnetic particles to be cleaned from the magnet cover 65. This is achieved by removing the magnet 60 from within the magnet cover 65, thus removing influence of the magnetic field on the particles. The particles may then be easily brushed from the magnet cover 65. Alternatively, only the magnet 60 may be removed from the housing 15 thus allowing the magnetic particles to either drop, or be washed, from the magnet cover 65 as described below.

If the flow through the apparatus 10 is stopped the magnetic particles drop to the bottom of the tapered section 25 and through bulb 6 where they can be emptied from the apparatus 10 by the removal of the plug 5. To wash the magnetic particles from the magnet cover 25, either the inlet 40 or the outlet 50 (not both) is opened to flush the magnetic particles from the magnet cover 65. During washing, the particles exit the apparatus 10 via the opening at the bottom of the bulb 6 (when plug 5 is removed).

Figure 4:
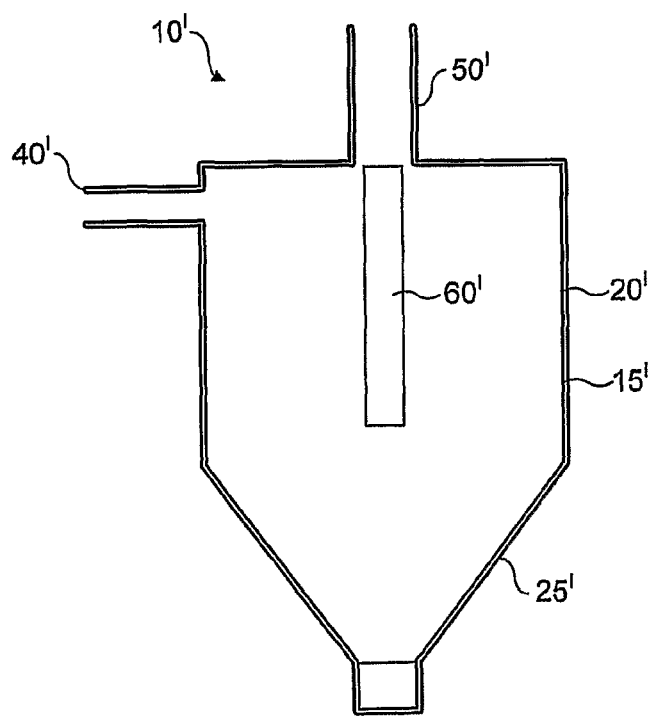
FIG. 4 shows an alternative apparatus according to the present invention.

FIG. 4 shows an example of an alternative apparatus 10'. This apparatus differs from the apparatus 10 described above in that it has no sleeve 30 and no magnet cover 65. In this example the outlet 50' is located at the top of the housing 20' above the magnet 60'. As described above in respect of apparatus 10, the water flows through apparatus 10' in a cyclonic motion such that particles are separated from the water by vortex separation as the water flows downwardly, and magnetic particles are collected on the magnet as the water flows upwardly.

The invention claimed is:

1. An apparatus for separating magnetic and non-magnetic particles from water in a domestic central heating system, comprising:
    a housing having an inlet and an outlet and an upper and lower end, and
    a magnet located within the housing,
    wherein the inlet and the outlet are arranged so that, in use, water flows through the apparatus in a cyclonic motion from the inlet downwardly proximate the walls of the housing, and then upwardly within the downwardly flowing water, to the outlet,
    wherein the housing is configured so that particles entrained within the water separate out by vortex separation as the water flows downwardly, and
    wherein the magnet is arranged so that magnetic particles entrained within the water are collected by the magnet as the water flows upwardly, the apparatus further comprising:
    a sleeve located within the housing such that an outer circulation channel is defined between the housing and the sleeve, the magnet being located within the sleeve such that an inner circulation channel is defined between the sleeve and the magnet,
    wherein the inlet is arranged to deliver the flow of water into the outer circulation channel and wherein the outlet is arranged to exhaust the flow of water from the inner circulation channel.

2. An apparatus as claimed in claim 1 further comprising a non-magnetic magnet cover which is arranged to prevent direct contact between the magnet and the water.

3. An apparatus as claimed in claim 2 wherein the magnet cover has a tapered end facing the lower end of the housing.

4. An apparatus as claimed in any one of claims 1 to 3 wherein the upper end of the housing has a larger cross-sectional area than the lower end of the housing.

5. An apparatus as claimed in claim 4 wherein the upper end of the housing is substantially cylindrical and wherein the lower end of the housing is substantially conical.

6. An apparatus as claimed in any one of claims 1 to 3 wherein the inlet and the outlet are located proximate the upper end of the housing.

7. An apparatus as claimed in any one of claims 1-3 further comprising a quiet zone located at the lower end of the housing.

8. An apparatus as claimed in claim 7 wherein the quiet zone comprises a substantially spherical bulb.

9. A method for separating magnetic and non-magnetic particles from water in a domestic central heating system, the method comprising:
    providing a housing containing a magnet located within a sleeve, wherein the sleeve is arranged so that an outer circulation channel is defined between the housing and the sleeve, and an inner circulation channel is defined between the sleeve and the magnet,
    flowing water in a cyclonic motion through the housing from an inlet located in the outer circulation channel downwardly proximate the walls of the housing, and then upwardly, within the downwardly flowing water, to an outlet located in the inner circulation channel, wherein particles are separated out from the water by vortex separation as the water flows downwardly, and wherein magnetic particles are collected from the water by the magnet as the water flows upwardly.

* * * * *